United States Patent
Fox

(10) Patent No.: US 8,670,481 B2
(45) Date of Patent: Mar. 11, 2014

(54) SYSTEM AND METHOD FOR DYNAMIC PROFILE MANAGEMENT IN CABLE MODEM SYSTEMS

(75) Inventor: David Fox, Bolton, MA (US)

(73) Assignee: Casa Systems, Inc., Andover, MA (US)

( * ) Notice: Subject to any disclaimer, the term of this patent is extended or adjusted under 35 U.S.C. 154(b) by 0 days.

(21) Appl. No.: 13/445,258

(22) Filed: Apr. 12, 2012

(65) Prior Publication Data
US 2013/0272353 A1 Oct. 17, 2013

(51) Int. Cl.
H04B 1/66 (2006.01)
H04B 7/212 (2006.01)
H04J 3/06 (2006.01)

(52) U.S. Cl.
USPC ............................. 375/240; 370/442; 370/503

(58) Field of Classification Search
USPC .................................. 375/298, 147; 370/480
See application file for complete search history.

(56) References Cited

U.S. PATENT DOCUMENTS

| | | | |
|---|---|---|---|
| 5,991,308 A * | 11/1999 | Fuhrmann et al. | 370/395.53 |
| 6,397,368 B1 * | 5/2002 | Yonge et al. | 714/792 |
| 6,577,630 B1 * | 6/2003 | Markwalter et al. | 370/392 |
| 6,647,069 B1 * | 11/2003 | Segal et al. | 375/278 |
| 6,650,624 B1 * | 11/2003 | Quigley et al. | 370/252 |
| 6,665,308 B1 * | 12/2003 | Rakib et al. | 370/441 |
| 6,898,755 B1 | 5/2005 | Hou | |
| 6,985,437 B1 | 1/2006 | Vogel | |
| 2001/0055319 A1 * | 12/2001 | Quigley et al. | 370/480 |
| 2002/0010641 A1 * | 1/2002 | Stevens et al. | 705/26 |
| 2002/0154620 A1 * | 10/2002 | Azenkot et al. | 370/347 |
| 2002/0186753 A1 * | 12/2002 | Kolze | 375/147 |
| 2004/0086059 A1 * | 5/2004 | Eroz et al. | 375/298 |
| 2005/0122996 A1 * | 6/2005 | Azenkot et al. | 370/477 |
| 2007/0002752 A1 | 1/2007 | Thibeault et al. | |
| 2008/0062889 A1 | 3/2008 | Azenko et al. | |
| 2008/0200129 A1 * | 8/2008 | Cooper et al. | 455/67.14 |
| 2009/0103557 A1 | 4/2009 | Hong et al. | |

OTHER PUBLICATIONS

International Search Report issued Jul. 26, 2013 in connection with co-pending PCT Application No. PCT/US2013/035934 (3 pages).
Written Opinion issued Jul. 26, 2013 in connection with co-pending PCT Application No. PCT/US2013/035934 (6 pages).

* cited by examiner

*Primary Examiner* — Chieh M Fan
*Assistant Examiner* — Sarah Hassan
(74) *Attorney, Agent, or Firm* — McCarter & English, LLP

(57) ABSTRACT

A system and method for dynamic profile management in a cable modem termination system (CMTS) is provided. A CMTS receiver is in communications with a plurality of cable modems, and a dynamic profile management module is in communication with the CMTS receiver. The dynamic profile management module establishes a communications profile for an upstream channel used by the CMTS receiver and at least one of the plurality of cable modems (the communications profile including a plurality of parameters associated with the upstream channel), continuously monitors performance metrics associated with communications across the upstream channel, and automatically adjusts the plurality of parameters of the communications profile in response to the monitored performance metrics.

26 Claims, 5 Drawing Sheets

SYSTEM AND METHOD FOR DYNAMIC PROFILE MANAGEMENT IN CABLE MODEM SYSTEMS

BACKGROUND OF THE INVENTION

1. Field of the Invention

The present invention relates generally to monitoring and controlling communications systems. More specifically, the present invention relates to a system and method for dynamic profile management in cable modem systems.

2. Related Art

Cable modems (CMs) can be found in both homes and businesses, and are used to transmit and receive digital information (e.g., to access the Internet, view television and/or on-demand video, etc.). Numerous CMs can communicate with a device known as a Cable Modem Termination System (CMTS), which is installed at a central location and used to transmit information to CMs, as well as receive information from CMs. The signal between these devices traverses a communications network that includes both coaxial cable and fiber optic cable, and is known as a Hybrid Fiber-Coax (HFC) network or cable "plant." The protocol used to communicate between the CMTS and CMs has been standardized by the CableLabs organization and is collectively known as DOCSIS (Data Over Cable Service Interface Specifications). The set of DOCSIS specifications define all levels of communication including the physical layer, media access control layer, and an application interface layer.

FIG. 1 is a diagram depicting a typical HFC plant topology. A CMTS 102 sends data traffic and control traffic over an HFC network to CMs 110 and/or set-top boxes (STBs). The HFC network includes radio frequency (RF) amplifiers 103, fiber optic cable 104, coaxial cables 106, and fiber optic nodes 108. The HFC allows for bi-directional communication between the CMTS 102 and the CMs 110. The CMTS 102 attaches to the HFC network via coaxial cable 106. The signals being sent over the coaxial cable is then translated to fiber optic signals and then back to coax cable by the fiber nodes 108. The translation to fiber is performed in order to allow for greater distances between the CMTS and the CMs.

Typically, many CMs share the bandwidth of a single coaxial cable, which usually has a bandwidth of approximately 1 GHz. The 1 GHz spectrum is divided into multiple channels. The spectrum consumed by a given channel is defined by its center frequency and width. For example, a channel might have a center frequency of 40 MHz and a width of 6.4 MHz. The portion of the spectrum occupied by this channel is therefore defined to be from (40 MHz−6.4 MHz/2)=36.8 MHz to (100 MHz+6.4 MHz/2)=43.2 MHz. This spectrum defines a 6.4 MHz channel centered around 40 MHz.

Each defined channel is typically shared by many CMs. In the downstream direction, from the CMTS to the CM, the CMTS will use time division multiplexing to send data to all CMs using a unique address to send data to a unique CM. In the upstream direction, from the CM to the CMTS, many CMs must share the same channel. To accomplish this, the CMTS schedules time slots for each CM known as "MAPs." A given CM is only allowed to send data during its assigned time slot. Synchronization signals from the CMTS to the CM keep the different CMs synchronized.

The HFC plant is subject to many different types of impairments that can degrade the quality of the signal. This is especially true in the upstream direction, where noise contributions from many CMs and households combine. These impairments are typically caused by problems such as loose or corroded connections, unterminated lines, faulty equipment, and other noise caused by sources such as motors and lightning. The DOCSIS specification provides a number of different tools to address the most common types of impairments such as: a variety of quadrature amplitude modulation (QAM) constellations; different channel widths; Reed-Solomon Forward Error Correction (R-S FEC); pre-equalization; and interleaving. By manually varying these parameters, a cable operator can seek to improve signal quality, making tradeoffs between throughput and improved noise immunity.

Existing CMTSs can provide various statistics which assist cable operators in determining the best configuration of settings for the CMTS given the presence of one or more impairments in a particular HFC plant. Some of these statistics include the Modulation Error Rate (MER), the percentage of correctable and uncorrectable errors, and power levels. Based upon these statistics, a cable operator can set up a configuration profile which contains the configuration parameters for the channel such as the QAM modulation order, R-S FEC codeword length and number of parity bytes, the channel width, and interleaving parameters, among other parameters.

Currently, there are some basic facilities available which allow a different upstream configuration profile to be automatically selected if certain configured thresholds are exceeded. For example, a cable operator might set up the system to move to a more robust profile if the uncorrectable error rate exceeds a certain threshold, or if the measured SNR crosses a programmed threshold. However, the process of configuring such profiles is a manual task, and typically only two different profiles are used (i.e., one primary profile and one secondary profile). In many cases, two different profiles are used because the HFC plant is noisier during certain times of the day. During these noisy periods, the CMTS can automatically switch to a different modulation profile which trades off lower performance for better noise immunity. During the quieter periods, a different modulation profile which allow for higher throughput may be used. Moreover, in the current art, the parameters within a profile are manually set up by the user, and a limited number of profiles are configured.

Typically, a single configuration profile is used for all CMs on a given channel. However, most CMTS vendors allow 2 to 4 logical channels to be configured. The logical channels all use the same physical channel. However, each logical channel may use a different profile, and CMs may be assigned to different logical channels. In this manner, some amount of customization may be achieved for different CMs on the channel.

SUMMARY OF THE INVENTION

The present invention relates to a system for dynamic profile management in a cable modem termination system (CMTS). The system includes a CMTS receiver in communication with a plurality of cable modems; and a dynamic profile management module in communication with the CMTS receiver. The dynamic profile management module establishes a communications profile for an upstream channel used by the CMTS receiver and at least one of the plurality of cable modems (the communications profile including a plurality of parameters associated with the upstream channel), monitors performance metrics associated with communications across the upstream channel, automatically adjusts parameters of the communications profile in response to the monitored performance metrics, and continues to monitor the plurality of performance metrics and adjust parameters of the communications profile to optimize performance of the upstream channel.

In another embodiment, a method for dynamic profile management in a cable modem termination system (CMTS) is provided. The method includes the steps of establishing a communications profile for an upstream channel used by a CMTS receiver and at least one cable modem in communication with the CMTS receiver, said communications profile including a plurality of parameters associated with the upstream channel; monitoring performance metrics associated with communications across the upstream channel using a dynamic profile management module in the CMTS receiver; automatically adjusting parameters of the communications profile in response to the monitored performance metrics; and continuing to monitor the plurality of performance metrics and adjust parameters of the communications profile to optimize performance of the upstream channel.

In another embodiment, a non-transitory, computer-readable medium having computer readable instructions stored thereon is provided. The instructions, when executed by a cable modem termination system (CMTS) receiver in communication with a plurality of cable modems, cause the receiver to perform the steps comprising: establishing a communications profile for an upstream channel used by a CMTS receiver and at least one cable modem in communication with the CMTS receiver, said communications profile including a plurality of parameters associated with the upstream channel; monitoring performance metrics associated with communications across the upstream channel using a dynamic profile management module in the CMTS receiver; automatically adjusting the parameters of the communications profile in response to the monitored performance metrics; and continuing to monitor the plurality of performance metrics and adjust parameters of the communications profile to optimize performance of the upstream channel.

In another embodiment, a receiver circuit for dynamic profile management in a cable modem system is provided. The receiver circuit includes a radio frequency (RF) front-end circuitry for receiving a QAM signal, and a dynamic profile management module in communication with the CMTS receiver, the dynamic profile management module: (i) establishing a communications profile for an upstream channel used by the CMTS receiver and at least one of the plurality of cable modems, the communications profile including a plurality of parameters associated with the upstream channel; (ii) monitoring performance metrics associated with communications across the upstream channel; and (iii) automatically adjusting parameters of the communications profile in response to the monitored performance metrics; and (iv) continuing to monitor the plurality of performance metrics and adjust parameters of the communications profile to optimize performance of the upstream channel.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for dynamic profile management in communications systems, as discussed in detail below in connection with FIGS. 1-5. By the term "profile" as used herein, it is meant one or more settings or parameters associated with communications in a cable modem termination system (CMTS) receiver.

The system and method for dynamic profile management automatically and dynamically manages profiles in a CMTS receiver by automatically adjusting configuration parameters including, but not limited to, RS-FEC codeword parameters, QAM modulation order, interleaving parameters, pre-equalization, and ingress cancellation, so as to optimize communications between the CMTS and a plurality of cable modems (CMs) or set-top boxes (STBs) in communication with the CMTS. The profile structure contains settings for all of the aforementioned parameters. Parameters within the profile are automatically and dynamically updated by the system, thereby effectively creating an infinite number of possible profiles. The processing steps carried out are discussed in detail below in connection with FIGS. 3-4. Before discussing such processing steps, it is useful to review the various parameters that can be dynamically configured, with particular attention to Table 1 below and FIGS. 2A-2B.

Table 1, below, lists various configuration parameters that can automatically be adjusted, as well as various associated metrics (performance parameters) which can be monitored and used to dynamically adjust the configuration parameters:

TABLE 1

| Configuration Parameters | Metrics (Performance Parameters) |
| --- | --- |
| R-S FEC Codeword Parameters | Burst Noise Characteristics<br>Signal-to-Noise Ratio (SNR) or<br>Modulation Error Ratio (MER)<br>QAM Modulation Order<br>Desired Error Rate (input from user) |
| QAM Modulation Order | SNR (or MER)<br>R-S FEC coding<br>Symbol Rate Desired Error Rate<br>(input from user) |
| Interleaving Parameters | Burst Noise Characteristics<br>Maximum Latency (input from user) |
| Pre-equalization On/Off | Equalizer Coefficients<br>Burst Noise Characteristics |
| Ingress Cancellation On/Off<br>Symbol Rate | Ingress Coefficients<br>SNR (or MER)<br>R-S FEC coding<br>Desired Error Rate (input from user)<br>Minimum throughput (input from user) |
| Power Level | SNR (or MER)<br>Burst Noise Characteristics<br>Desired Error Rate (input from user) |

The "Metrics" column above lists different performance parameters that can be monitored in order to determine appropriate values for the configuration parameters. Some of the parameters also rely upon other parameters. The configuration parameters can also be based upon input from the user. For example, a user can specify the desired error rate as well as the maximum allowable latency. With only a small amount of guidance from the user, the best values for the key parameters can be automatically determined by the dynamic profile management module.

Figure 1:
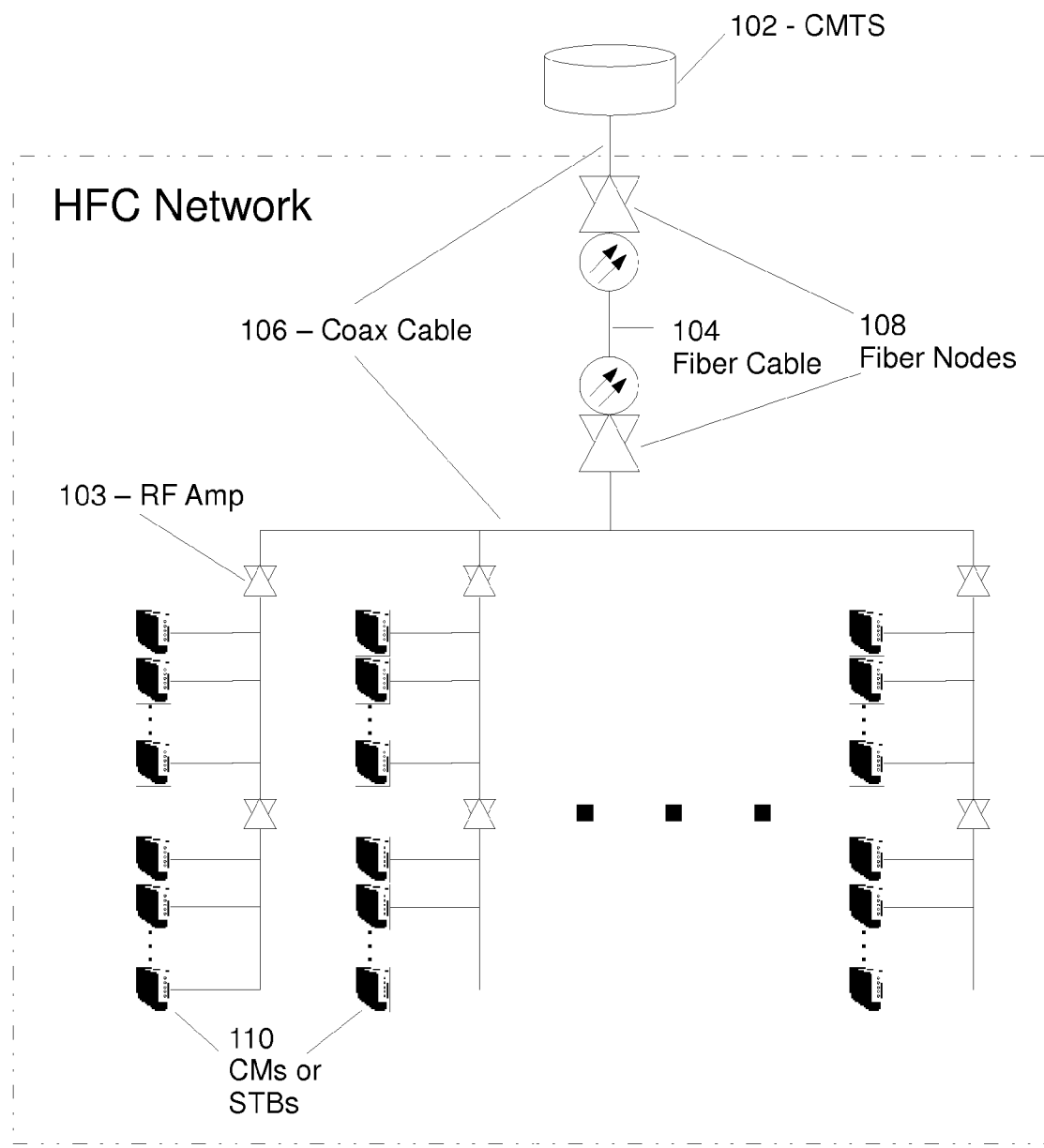
FIG. 1 is a diagram of a prior art HFC network (plant) including a CMTS and associated CMs.
Figure 2A:
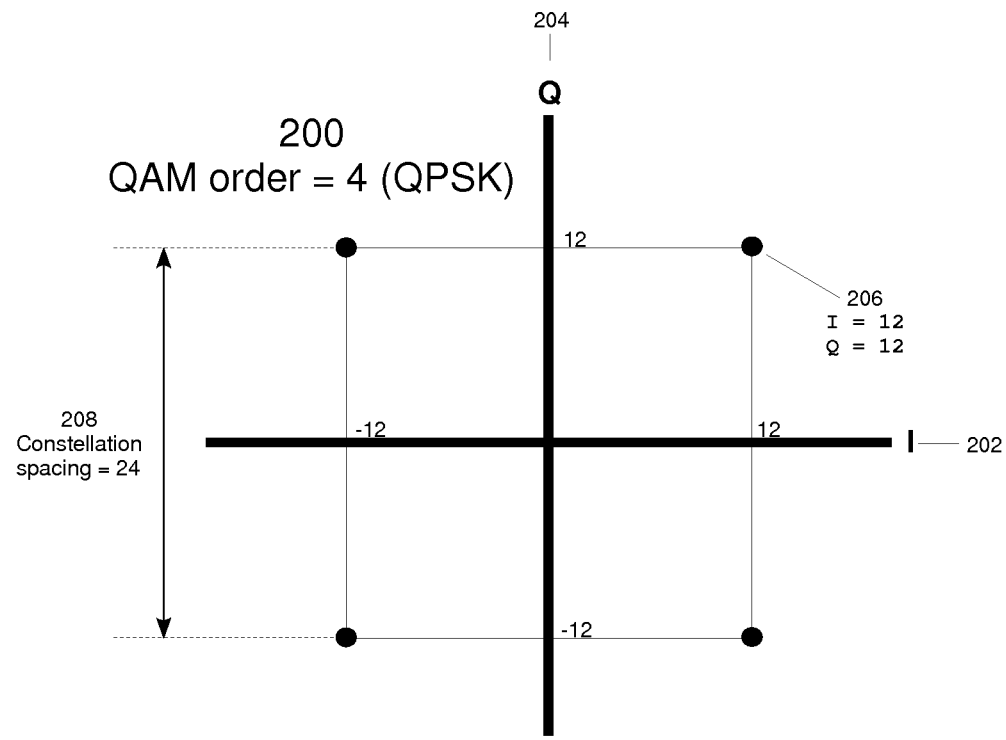
FIGS. 2A-2B are diagrams illustrating different QAM modulation orders capable of being dynamically varied.
Figure 2B:
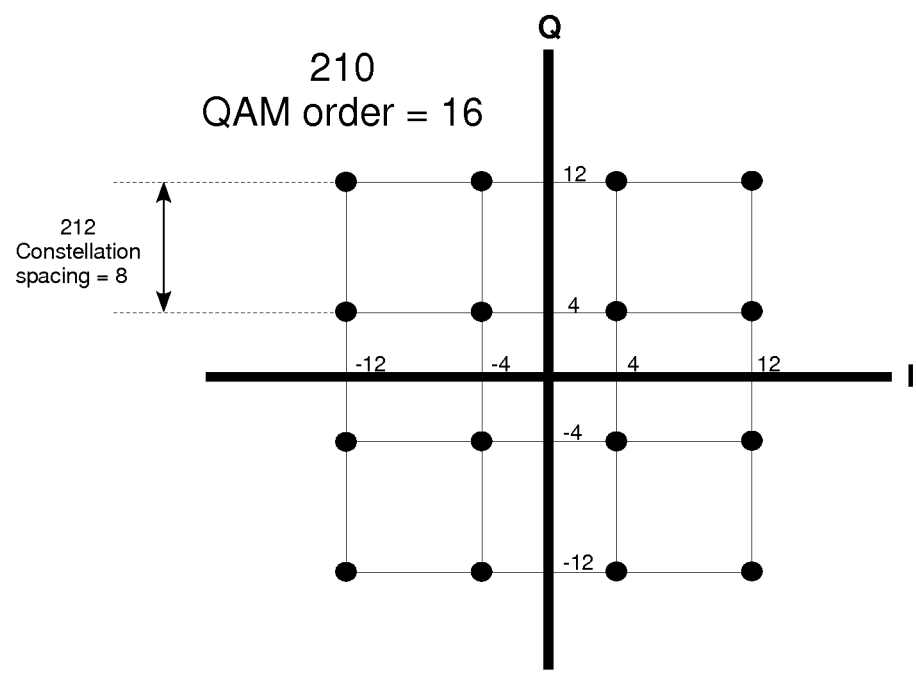

FIGS. 2A-2B are diagrams illustrating dynamic adjustment of QAM modulation orders to optimize upstream communications with a CMTS receiver. QAM modulation varies both the amplitude and the phase of the signal to represent values. The number of different possible values that can be represented is referred to the QAM modulation order. For example, a 16-QAM modulation can represent 16 different points. FIGS. 2A-2B show examples of two different QAM constellations, 4-QAM (Quadrature Phase Shift Keying, or QPSK) indicated by reference numeral 200 in FIG. 2A, and 16-QAM, indicated by reference numeral 210 in FIG. 2B. The constellations shown represent the imaginary and quadrature amplitudes of all of the possible decoded points in an X-Y plane. Every decoded point is referred to as a symbol. For QPSK, since there are 4 symbols, then each symbol can represent a different 2-bit value. With the 16-QAM constellation, each symbol can represent a different 4-bit value. Given a system with a fixed symbol rate, the 16-QAM constellation can send twice as much data as the QPSK constellation in the same period of time, and therefore has twice the throughput.

In the QPSK case illustrated in FIG. 2A, as shown by reference numeral 208, the spacing between constellation points on any given axis is 24. In the 16-QAM case illustrated in FIG. 2B, the spacing is only 8, as indicated by reference numeral 212. Noise in the plant will cause the constellation points to move from the ideal constellation points shown in FIG. 2A. If the constellation points move too far, they can be mistaken for a different constellation point by the symbol decoder. Because the spacing between constellation points is greater in the QPSK case shown in FIG. 2B, QPSK can tolerate more noise than 16-QAM. However, the throughput of QPSK is only half of that of 16-QAM. Therefore, selection of the QAM modulation order is a tradeoff between throughput and noise immunity. As will be discussed in greater detail below in connection with FIGS. 3-4, QAM modulation orders can be dynamically adjusted (e.g., by switching from 4-QAM modulation as shown in FIG. 2A to 16-QAM as shown in FIG. 2B), as well as other parameters, in order to optimize communications between a CMTS and a plurality of CMs/STBs in communication with the CMTS.

Figure 3:
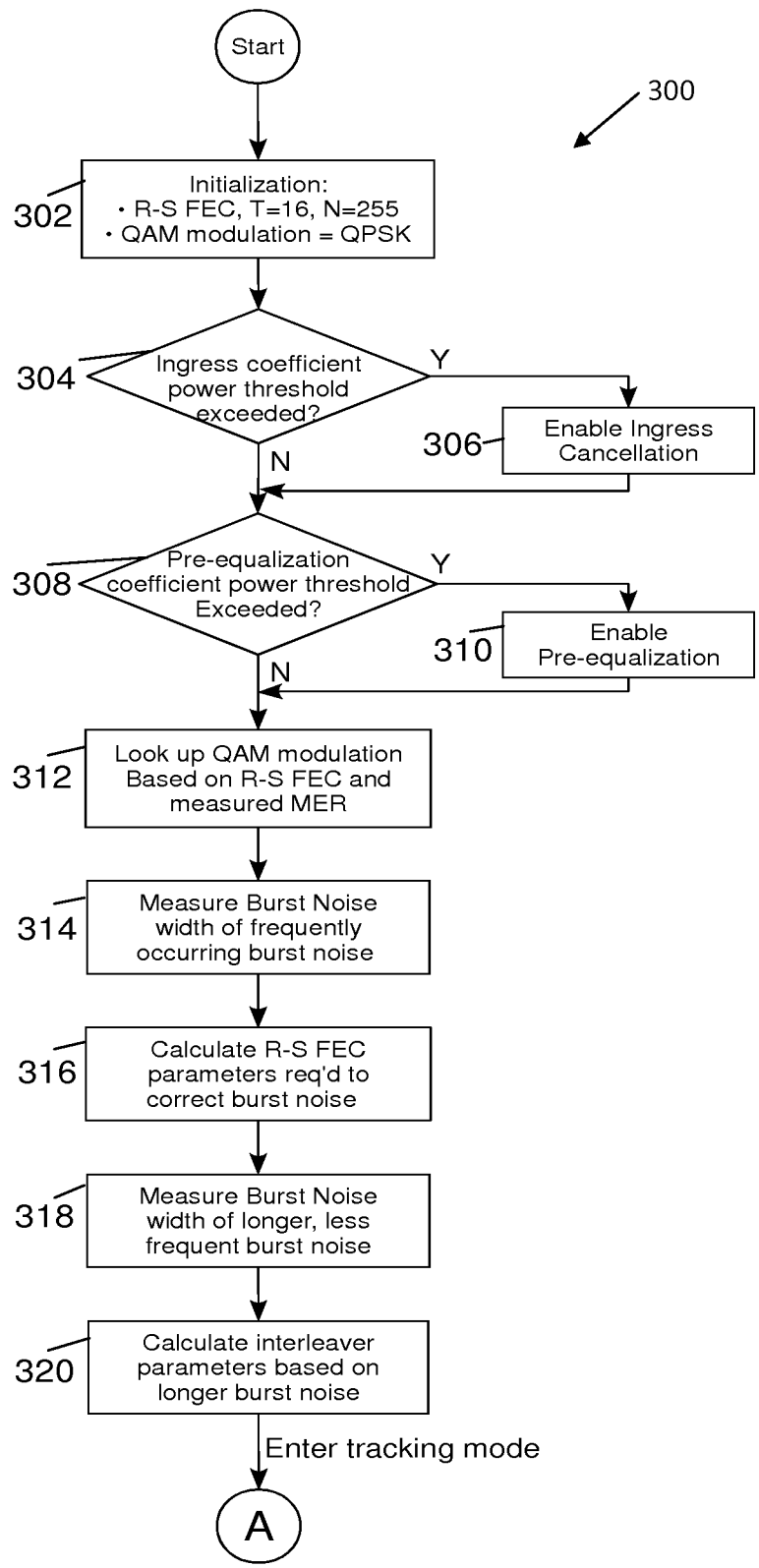
FIGS. 3-4 are flowcharts showing processing steps for dynamically managing profiles in a CMTS.

FIG. 3 is a flowchart showing processing steps, indicated generally at 300, for setting initial profile parameters for a CMTS receiver (e.g., following a "reset" of CMTS hardware). In step 302, the process begins by setting a CMTS receiver to operate using QPSK QAM modulation, and by setting R-S FEC parameters to pre-defined initial values, e.g., the value T can be set to 16 and the value N can be set to 255. R-S FEC functions by assigning a programmable number of parity bytes (referred to as "2*T") to a programmable number of data bytes (referred to as "K"). The data is broken up into codewords where each codeword consists of "K" data bytes and "2*T" parity bytes. The value "T" is the number of corrupted bytes that can be corrected by the R-S code. The DOCSIS specification allows for a maximum T value of 16, and a maximum codeword length (N=K+2*T) of 255. By varying the T value and the codeword length, the user can trade off efficiency for error correction capability. It is noted that other values for T and N can be set in step 302 without departing from the spirit or scope of the present invention. Then, in step 304, a determination is made as to whether ingress coefficient power thresholds have been exceeded, so that any ingress or equalization issues can be corrected. If a positive determination is made, step 306 occurs, wherein ingress cancellation is enabled. The term "ingress," as used herein, refers to narrowband tones which may be removed by a filter, such as an Ingress Cancellation Filter (ICF). During quiet periods, the ICF determines the required coefficient values to cancel one or more ingress tones. By summing up the power contained in all of the ingress coefficients, a threshold can be established for identifying whether ingress cancellation is required. Otherwise, if a negative determination is made in step 304, step 308 occurs.

In step 308, a determination is made as to whether power thresholds for pre-equalization coefficients have been exceeded. In this step, when a CM is transmitting data during a DOCSIS periodic ranging process, pre-equalization coefficients are calculated. If a positive determination is made, step 310 occurs, wherein pre-equalization is enabled. By determining the power contained in the coefficients of each tap of the filter, it can be determined if pre-equalization is required. Once any ingress tones and/or equalization issues have been resolved, the proper Quadrature Amplitude Modulation (QAM) order can be determined in step 312.

As shown in step 312, the QAM modulation order is determined based on at least the Modulation Error Rate (MER) and the selected Reed-Solomon Forward Error Correction (R-S FEC) code, e.g., by reference to a look-up table. The MER is measured by the CMTS for every received burst of data. The MER is the primary metric used for determining the noise floor, and Average White Noise Gain (AWGN) is the primary contributor to the noise floor. The noise floor is a relatively steady level of noise which is always present. The measured MER averaged over time provides an indication of the level of AWGN. The measured MER along with the R-S FEC (initial values established in step 302) are used to determine an appropriate QAM modulation order in step 312.

Next, the desired R-S FEC parameters are chosen in step 312. R-S FEC is used for correcting corrupted bytes due to both AWGN and burst noise. Burst noise occurs sporadically and lasts for a short period of time. Both AWGN and burst noise will cause bursts of errors to occur in temporal proximity. Since R-S FEC is designed to correct for a number of errors in a short period of time, it has found to be an excellent choice for both AWGN and burst noise. However, other types of error correction techniques could be used. It has also been found that specifying a relatively strong R-S FEC codeword in step 312, such as T=16 and N=255, provides excellent results. However, other values could be specified. The coding gain provided by R-S FEC versus the bandwidth lost is a good tradeoff when compared to other methods of improving the AWGN noise performance, such as changing the QAM modulation order. While R-S FEC provides a coding gain of approximately 4-6 dB, changing to a modulation order to the next modulation order down provides a coding gain of approximately 3 dB. Stronger R-S FEC parameters also provide for better burst noise immunity.

As shown in steps 314 and 316, the process proceeds by measuring the burst noise width of frequently occurring burst noise (step 314) and by calculating R-S FEC parameters that are required to correct the burst noise (step 316). By measuring the width of burst noise events and the frequency of occurrence, the CMTS can determine the R-S FEC parameters required to remove burst noise events that occur with a sufficiently high frequency to violate the desired bit error rate. The R-S FEC is designed to handle the most frequent type of burst noise, which tends to be less than 2 microseconds in duration. Longer burst events which occur less frequently can be partially addressed by programming the interleaving parameters appropriately. Interleaving functions by "striping" across codewords such that the bytes of a given codeword are not transmitted sequentially. For example, when multiple codewords are present, the first byte of each codeword is not transmitted sequentially before starting with the second byte of each codeword. By spreading out the codewords in this fashion, a burst of noise will impact a small number of bytes in many codewords instead of a large number of bytes in a single codeword. By reducing the number of corrupted bytes per codeword, the R-S FEC code has a better chance at correcting each codeword.

In steps 318 and 320, burst noise widths of longer and less-frequent duration are measured (step 318) and interleaver parameters are calculated based upon longer burst noise (step 320). Initial interleaving parameters are determined by measuring the length of frequency of occurrence of longer bursts which cannot be corrected by the R-S FEC code. Based upon the measured size, appropriate interleaving parameters are selected which do not exceed a user input maximum latency number.

Figure 4:
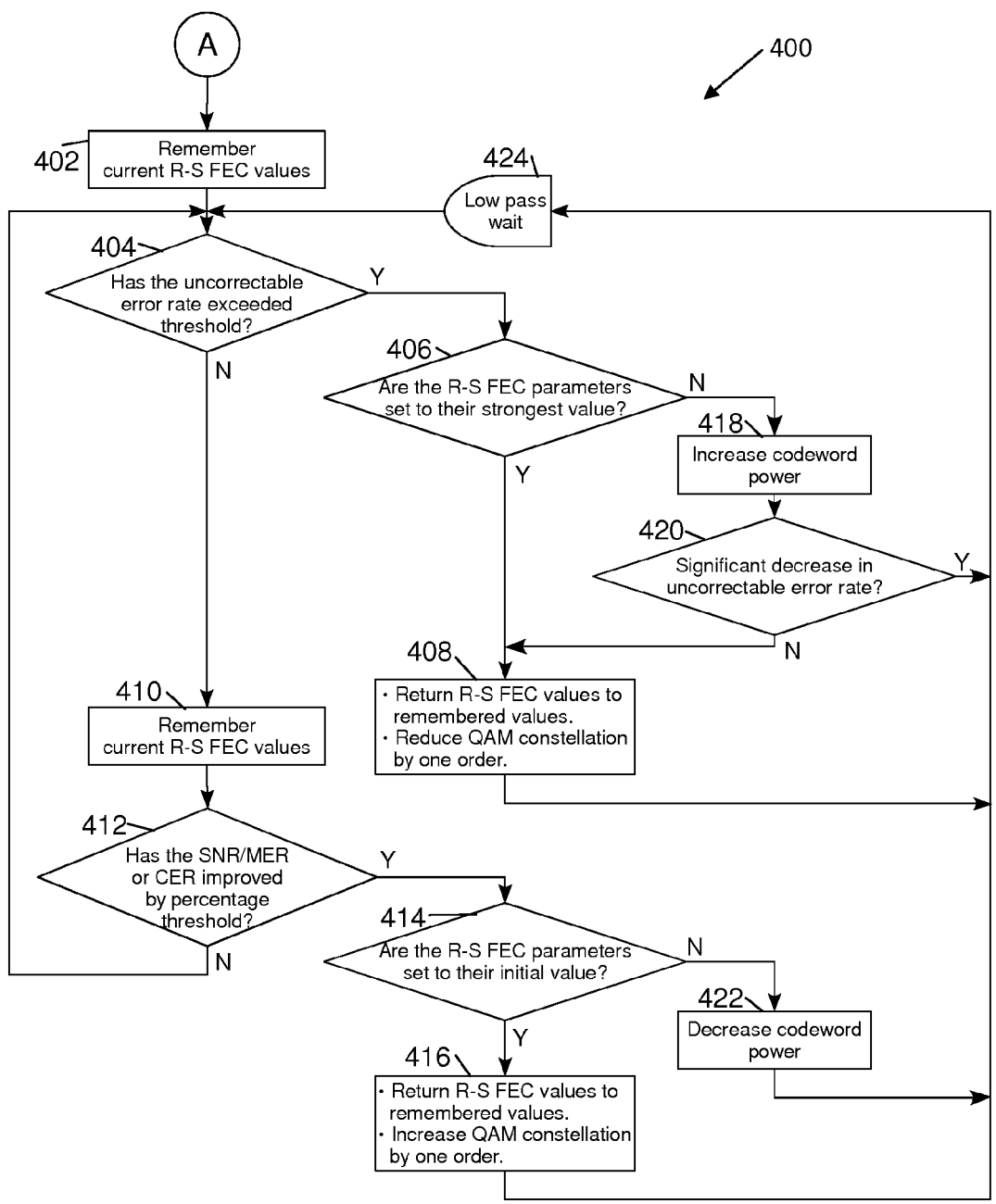

Once the initial QAM modulation order and R-S FEC parameters have been set, the system enters a "tracking" or "maintenance" mode, as shown in detail in the process steps 400 illustrated in FIG. 4. Specifically, the process steps 400 utilize ongoing CMTS receiver measurements, such as bit error rates, modulation error rates, and power measurements, to continually recalculate and optimize various CMTS receiver parameters in each channel's profile.

Both a correctable error rate and an uncorrectable error rate are measured by the CMTS for every channel. The correctable error rate is of interest in determining if the configured settings are too aggressive, and the uncorrectable error rate is of interest in determining if the configured settings aren't aggressive enough. Beginning in step 402, current R-S FEC parameters are stored in memory. In step 404, a determination is made as to whether the uncorrectable error rate has exceeded a pre-defined threshold. If a positive determination is made, step 406 occurs, wherein the system determines whether R-S FEC parameters are set to the strongest possible values. If a positive determination is made, step 408 occurs, wherein R-S FEC parameters are returned to the levels stored in memory in step 402. Then, control passes to step 424, wherein the system enters a low-pass wait mode. The low-pass wait mode utilizes a low pass filter mechanism to prevent the settings from continually oscillating. A minimum period of wait time between corrections can be established/programmed by the user, if desired. After the low-pass wait mode in step 424, control returns to step 404.

If a negative determination is made in step 406, step 418 occurs, wherein the system increases R-S FEC codeword power. Then, in step 420, a determination is made as to whether a significant decrease has occurred in the uncorrectable error rate. If a positive determination is made, control passes to step 424 described above. Otherwise, control passes to step 408, described above. If, in step 404, a negative determination is made (i.e., that the uncorrectable error rate has not exceeded a pre-defined threshold), step 410 occurs, wherein the system stores the current R-S FEC values in memory. Then, in step 412, a determination is made as to whether the signal-to-noise ratio (SNR), modulation error rate (MER), and/or codeword error rate (CER) have improved by a threshold percentage. If a negative determination is made, control passes back to step 404 discussed above. Otherwise, step 414 occurs, wherein a determination is made as to whether the R-S FEC parameters have been set to their initial values. If a positive determination is made, step 416 occurs, wherein the R-S FEC values are returned to the values stored in step 402, and the QAM constellation order is increased by one order. Then, control passes to step 424 described above. Otherwise, step 422 occurs, wherein the codeword power is decreased and control then passes to step 424 discussed above.

Figure 5:
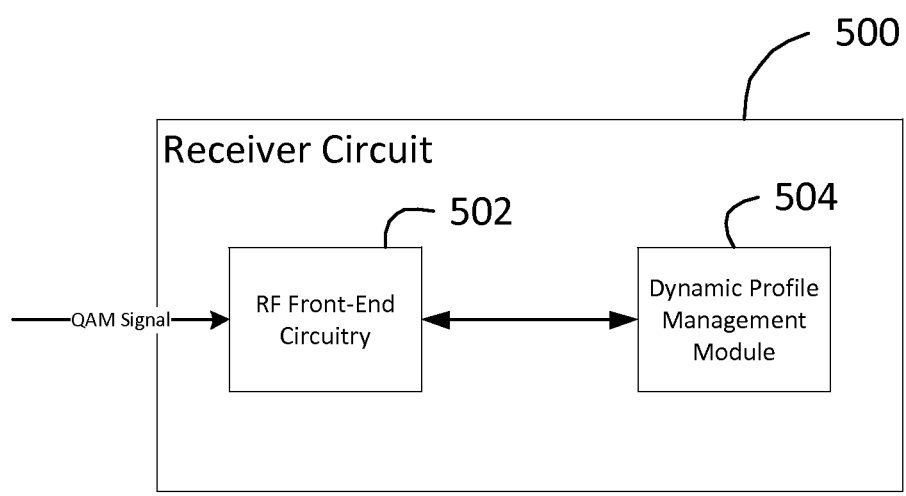
FIG. 5 is a diagram showing a sample receiver circuit in which the present invention could be implemented.

FIG. 5 is a block diagram showing a circuit 500 for dynamic profile management in cable modem systems. The circuit 500 includes hardware components which perform the functions discussed hereinabove. The circuit 500 includes radio frequency (RF) front-end circuitry 502 for acquiring a QAM signal (e.g., from an HFC network), as well as a dynamic profile management module 504 for performing the dynamic profile management functions discussed herein based upon the QAM signal received by the RF front-end circuitry 502. The dynamic profile management module 504 could be embodied as a field-programmable gate array (FPGA) or application-specific integrated circuit (ASIC) chip, and optionally, any associated discrete and/or integrated circuitry needed to support the FPGA and/or ASIC and to interface the FPGA/ASIC to the RF front-end circuitry 502. Further, the module 504 could comprise software instructions stored on a computer-readable medium that is installed in and/or in communication with a CMTS, such that the CMTS can read and execute such instructions in order to provide the dynamic profile management functionality described herein. In such circumstances, the software instructions stored on the computer-readable medium could be executed by a microprocessor, a microcontroller, and/or a Digital Signal Processor (DSP) within the CMTS. Such a computer-readable medium could include, but is not limited to, non-volatile memory such as read-only memory (ROM), electrically-erasable ROM (EEPROM), flash memory, disk memory, etc. It is also noted that the processing steps disclosed herein could be handled by separate hardware and/or software components. It is further noted that the receiver circuit 500 could be installed in a CMTS (e.g., the CMTS 102 shown in FIG. 1) that forms part of an HFC network, in a diagnostic device that is connected to the HFC network (e.g., either permanently or temporarily), or in a portable device that can be easily carried by technicians servicing an HFC network.

There are many advantages provided by the dynamic profile management disclosed herein. For example, it is very time consuming and tedious to try to generate the optimum configuration for each and every upstream channel in a cable modem system. The dynamic profile management relieves this burden from the cable operator, and provides a customized configuration for every channel. Many cable operators will chose to simply use a single profile which provides acceptable performance for their noisiest channels. Not only is this not optimum for cleaner channels, but it's also not always the optimum profile for the noisiest channels which might experience their worst case noise conditions only for a short period of time each day. Dynamic profile management can therefore greatly improve the overall throughput of every channel in the system by dynamically tuning the channel parameters to the characteristics of each channel at any given time. Moreover, it is noted that, in addition to providing a customized profile for every channel, the present invention can be extended to provide customized profiles for every CM in a cable modem system.

Another advantage provided by the dynamic profile management disclosed herein is that the upstream profile may be continually changed over time as plant conditions change. While operators currently have the ability to select between different profiles dependent upon plant conditions, these profiles are presently configured manually, and there are typically only two different profiles to choose between. The dynamic profile management allows for a large number of configuration possibilities by automatically changing the parameters within the profile based upon propriety algorithms. This is in contrast to current systems which can only switch between a small number of manually configured profiles, and which switch based upon conditions which are manually configured by the user. The dynamic profile management module establishes a communications profile for an upstream channel used by the CMTS receiver and at least one of the plurality of cable modems (the communications profile including a plurality of parameters associated with the upstream channel), continuously monitors performance metrics associated with communications across the upstream channel, and automatically adjusts the plurality of parameters of the communications profile in response to the monitored performance metrics.

In summary, the system determines the optimum configuration parameters for an upstream channel given the plant conditions at a given time. This frees the operator from the tedious task of determining the proper configuration for every upstream channel, and provides for dynamic management of the upstream profile as plant conditions change. This automated management allows for better efficiencies to be realized as the CMTS can recalculating the optimum configuration values.

Having thus described the invention in detail, it is to be understood that the foregoing description is not intended to limit the spirit or scope thereof. What is desired to be protected is set forth in the following claims.

What is claimed is:

1. A system for dynamic profile management in a cable modem termination system (CMTS), comprising:
    a CMTS receiver in communication with a plurality of cable modems; and
    a dynamic profile management module in communication with the CMTS receiver, the dynamic profile management module: (i) establishing an initial communications profile for each of the plurality of cable modems; (ii) monitoring a plurality of performance metrics associated with communications between the CMTS and each of the plurality of cable modems; (iii) automatically adjusting parameters of the initial communications profiles in response to the monitored performance metrics to create a customized communications profile for each of the cable modems based upon the monitored performance metrics; and (iv) continuing to monitor the plurality of performance metrics and adjust parameters of the customized communications profiles to optimize performance of the plurality of cable modems, wherein the monitored performance metrics comprise at least one of a Modulation Error Rate (MER), a correctable Code Error Rate (CER), an uncorrectable CER, measured burst noise duration, burst noise frequency of occurrence, power associated with equalizer coefficients, and power associated with ingress cancellation filter coefficients.

2. The system of claim 1, wherein the dynamic profile management module automatically adjusts Reed-Solomon Forward Error Correction (R-S FEC) parameters in response to the performance metrics.

3. The system of claim 1, wherein the dynamic profile management module automatically adjusts interleaving parameters in response to the performance metrics.

4. The system of claim 1, wherein the dynamic profile management module automatically adjusts a QAM modulation order in response to the performance metrics.

5. The system of claim 1, wherein the dynamic profile management module automatically adjusts a channel width in response to the performance metrics.

6. The system of claim 1, wherein the dynamic profile management module automatically adjusts CMTS power levels in response to the performance metrics.

7. The system of claim 1, wherein the dynamic profile management module automatically enables or disables pre-equalization in response to the performance metrics.

8. The system of claim 1, wherein the dynamic profile management module automatically enables or disables ingress cancellation in response to the performance metrics.

9. The system of claim 1, wherein the dynamic profile management module establishes a plurality of profiles for multiple upstream channels between the CMTS and the plurality of cable modems.

10. The system of claim 9, wherein the dynamic profile management module automatically configures parameters for each of the profiles based upon monitored performance metrics associated with the plurality of cable modems.

11. A method for dynamic profile management in a cable modem termination system (CMTS), comprising the steps of:
    establishing an initial communications profile for a plurality of cable modems in communication with the CMTS receiver;
    monitoring performance metrics associated with communications between the plurality of cable modems and the CMTS receiver using a dynamic profile management module in the CMTS receiver;
    automatically adjusting parameters of the initial communications profile in response to the monitored performance metrics to create a customized communications profile for each of the cable modems based upon the monitored performance metrics; and
    continuing to monitor the plurality of performance metrics and adjust parameters of the customized communications profiles to optimize performance of the plurality of cable modems, wherein the monitored performance metrics comprise at least one of a Modulation Error Rate (MER), a correctable Code Error Rate (CER), an uncorrectable CER, measured burst noise duration, burst noise frequency of occurrence, power associated with equalizer coefficients, and power associated with ingress cancellation filter coefficients.

12. The method of claim 11, wherein the step of automatically adjusting parameters comprises automatically adjusting Reed-Solomon Forward Error Correction (R-S FEC) parameters in response to the performance metrics.

13. The method of claim 11, wherein the step of automatically adjusting parameters comprises automatically adjusting interleaving parameters in response to the performance metrics.

14. The method of claim 11, wherein the step of automatically adjusting parameters comprises automatically adjusting a QAM modulation order in response to the performance metrics.

15. The method of claim 11, wherein the step of automatically adjusting parameters comprises automatically adjusting a channel width in response to the performance metrics.

16. The method of claim 11, wherein the step of automatically adjusting parameters comprises automatically adjusting CMTS power levels in response to the performance metrics.

17. The method of claim 11, wherein the step of automatically adjusting parameters comprises automatically enabling or disabling pre-equalization in response to the performance metrics.

18. The method of claim 11, wherein the step of automatically adjusting parameters comprises automatically enabling or disabling ingress cancellation in response to the performance metrics.

19. A non-transitory, computer-readable medium having computer readable instructions stored thereon which, when executed by a cable modem termination system (CMTS) receiver in communication with a plurality of cable modems, cause the receiver to perform the steps comprising:
    establishing an initial communications profile for a plurality of cable modems in communication with the CMTS receiver;

monitoring performance metrics associated with communications between the plurality of cable modems and the CMTS receiver using a dynamic profile management module in the CMTS receiver;

automatically adjusting parameters of the initial communications profile in response to the monitored performance metrics to create a customized communications profile for each of the cable modems based upon the monitored performance metrics; and continuing to monitor the plurality of performance metrics and adjust parameters of the customized communications profiles to optimize performance of the plurality of cable modems, instructions for causing the receiver to perform the step of monitoring at least one of a Modulation Error Rate (MER), a correctable Code Error Rate (CER), an uncorrectable CER, measured burst noise duration, burst noise frequency of occurrence, power associated with equalizer coefficients, and power associated with ingress cancellation filter coefficients.

20. The computer-readable medium of claim 19, further comprising instructions for causing the receiver to perform the step of automatically adjusting one or more of a Reed-Solomon Forward Error Correction (R-S FEC) parameter, an interleaving parameter, a QAM modulation order, a channel width, or a CMTS power level in response to the performance metrics.

21. The computer-readable medium of claim 19, further comprising instructions for causing the receiver to perform the step of automatically enabling or disabling pre-equalization in response to the performance metrics.

22. The computer-readable medium of claim 19, further comprising instructions for causing the receiver to perform the step of automatically enabling or disabling ingress cancellation in response to the performance metrics.

23. A receiver circuit for dynamic profile management in a cable modem termination system, comprising:

radio frequency (RF) front-end circuitry for receiving a QAM signal; and a dynamic profile management module in communication with the CMTS receiver, the dynamic profile management module: (i) establishing a customized communications profile for each upstream channel between the CMTS receiver and at least one of the plurality of cable modems, the communications profile including a plurality of parameters associated with a respective upstream channel; (ii) monitoring performance metrics associated with communications across the upstream channel; (iii) automatically adjusting parameters of the communications profile in response to the monitored performance metrics; and (iv) continuing to monitor the plurality of performance metrics and adjust parameters of the communications profile to optimize performance of the upstream channel, wherein the monitored performance metrics comprise at least one of a Modulation Error Rate (MER), a correctable Code Error Rate (CER), an uncorrectable CER, measured burst noise duration, burst noise frequency of occurrence, power associated with equalizer coefficients, and power associated with ingress cancellation filter coefficients.

24. The circuit of claim 23, wherein the dynamic profile management module automatically adjusts one or more of a Reed-Solomon Forward Error Correction (R-S FEC) parameter, an interleaving parameter, a QAM modulation order, a channel width, or a CMTS power level in response to the performance metrics.

25. The circuit of claim 23, wherein the dynamic profile management module automatically enables or disables pre-equalization in response to the performance metrics.

26. The circuit of claim 23, wherein the dynamic profile management module automatically enables or disables ingress cancellation in response to the performance metrics.

* * * * *